US012755212B2

(12) United States Patent
Chao et al.

(10) Patent No.: US 12,755,212 B2
(45) Date of Patent: Oct. 6, 2026

(54) SYSTEM AND METHOD THEREOF FOR ESTABLISHING EXTUBATION PREDICTION USING MACHINE LEARNING MODEL

(71) Applicants: Taichung Veterans General Hospital, Taichung City (TW); Tunghai University, Taichung City (TW)

(72) Inventors: Wen-Cheng Chao, Taichung City (TW); Kai-Chih Pai, Taichung (TW); Ming-Cheng Chan, Taichung City (TW); Chieh-Liang Wu, Taichung City (TW); Min-Shian Wang, Taichung City (TW); Chien-Lun Liao, Taichung City (TW); Ta-Chun Hung, Taichung City (TW); Yan-Nan Lin, Taichung City (TW); Hui-Chiao Yang, Taichung City (TW); Ruey-Kai Sheu, Taichung (TW); Lun-Chi Chen, Taichung (TW)

(73) Assignees: TAICHUNG VETERANS GENERAL HOSPITAL, Taichung City (TW); TUNGHAI UNIVERSITY, Taichung (TW)

( * ) Notice: Subject to any disclaimer, the term of this patent is extended or adjusted under 35 U.S.C. 154(b) by 634 days.

(21) Appl. No.: 18/339,220

(22) Filed: Jun. 21, 2023

(65) Prior Publication Data

US 2024/0394605 A1 Nov. 28, 2024

(30) Foreign Application Priority Data

May 23, 2023 (TW) ................................ 112119171

(51) Int. Cl.
*G06N 20/20* (2019.01)

(52) U.S. Cl.
CPC .................................. *G06N 20/20* (2019.01)

(58) Field of Classification Search
None
See application file for complete search history.

(56) References Cited

FOREIGN PATENT DOCUMENTS

| | | |
|---|---|---|
| CN | 116052878 A | 5/2023 |
| TW | 202247863 A | 12/2022 |

OTHER PUBLICATIONS

Pai et al., Explainable machine learning approach to predict extubation in critically ill ventilated patients: a retrospective study in central Taiwan; Pai et al. BMC Anesthesiology (2022) 22:351; Nov. 14, 2022; Total Pages: 11 (Year: 2022).*

(Continued)

*Primary Examiner* — Alan Chen
(74) *Attorney, Agent, or Firm* — MUNCY, GEISSLER, OLDS & LOWE, P.C.

(57) ABSTRACT

The invention provides a system and a method thereof for establishing an extubation prediction using a machine learning model capable of obtaining an extubation prediction model and key features used by the extubation prediction model through training and/or verification of a machine learning model, and analyzing key feature data of a patient in real time through the extubation prediction model in order to obtain a possibility of extubation of the patient and its related explanation. Accordingly, the system and the method thereof for establishing the extubation prediction using the machine learning model disclosed in the invention are used as a tool for clinical caregivers to evaluate extubation in order to reduce a possibility of reintubation due to inability to breathe spontaneously after extubation.

10 Claims, 10 Drawing Sheets
(1 of 10 Drawing Sheet(s) Filed in Color)

(56) References Cited

OTHER PUBLICATIONS

Fleuren et al., Predictors for extubation failure in COVID-19 patients using a machine learning approach; Critical Care (2021) 25: 448; Dec. 27, 2021; Total pp. 10 (Year: 2021).*
Fabregat et al., A Machine Learning decision-making tool for extubation in Intensive Care Unit patients; Computer Methods and Programs in Biomedicine 200 (2021); Total pp. 9 (Year: 2021).*
Ming-Yen Lin et al., "Explainable Machine Learning to Predict Successful Weaning of Mechanical Ventilation in Critically Ill Patients Requiring Hemodialysis," Healthcare (Basel), Mar. 21, 2023, 11(6):910. doi: 10.3390/healthcare11060910, 13 pages.
Kai-Chih Pai et al., "Explainable machine learning approach to predict extubation in critically ill ventilated patients: a retrospective study in central Taiwan," BMC Anesthesiology , vol. 22, Article No. 351 (2022), 11 pages.

* cited by examiner

SYSTEM AND METHOD THEREOF FOR ESTABLISHING EXTUBATION PREDICTION USING MACHINE LEARNING MODEL

FIELD OF THE INVENTION

The invention relates to a system and a method for extubation prediction, and more particularly to a system and a method thereof for establishing an extubation prediction using a machine learning model.

DESCRIPTION OF THE RELATED ART

According to statistics, more than 80% of patients in the intensive care unit need to rely on mechanical ventilation assistance to maintain their lives, and research shows that the longer the patient relies on mechanical ventilation assistance, the more difficulty for the patient to be removed from mechanical ventilation assistance, and can even evolve into a long-term dependence on mechanical ventilation assistance to survive, or in a short period of time after being removed from a ventilator, the patient has to be re-intubated again to rely on mechanical ventilation assistance to maintain survival.

In order to increase the success rate of patients to be removed from mechanical ventilation assistance, many studies are currently using various research methods to predict the time score and success rate of patients to be removed from mechanical ventilation assistance. For example, some studies conduct statistical analysis by collating the data of patients in intensive care units and chronic ventilatory care units, their clinical features, reasons for using ventilators, chronic complications, and reasons for difficulty in removing ventilators in order to summarize the features of patients who have difficulty in removing from mechanical ventilation assistance. However, the conditions of each of the patients is not the same and the conditions change rapidly. The results obtained through the retrospective statistical analysis method will not be able to accurately predict the time score suitable for extubation and removal from a ventilator.

SUMMARY OF THE INVENTION

A main object of the invention is to provide a system and a method thereof for establishing an extubation prediction using a machine learning model capable of automatically predicting a possibility of extubation of hospitalized patients in real time to be used as a tool for clinicians to evaluate a success rate of extubation of patients.

Another object of the invention is to provide a system and a method thereof for establishing an extubation prediction using a machine learning model capable of providing reasons or related instructions for predicting a possibility of extubation in order to increase reliability and interpretability of a possibility of extubation.

In order to achieve the above objects, the invention provides a system for establishing an extubation prediction using a machine learning model comprising a processing device for analyzing key feature data of a patient to be predicted through an extubation prediction model to generate a possibility of extubation of the patient to be predicted, wherein the key feature data comprise physiological parameter data, and consciousness data, input/output liquid data and ventilatory function data obtained 1 day or/and 2 days before a day of performing the extubation prediction.

Wherein the extubation prediction model is selected from a group consisting of XGBoost (Extreme Gradient Boosting), CatBoost (categorical boosting), LightGBM (light gradient boosting machine), random forest algorithm (RF) and logistic regression (LR).

Wherein the possibility of extubation is a possibility of the patient to be predicted to be removed from a ventilatory assistance device within 24 hours after the day of performing the extubation prediction.

Wherein the processing device has a data processing module and an extubation prediction module, and the data processing module is used to extract the key feature data from feature data of the patient to be predicted; the extubation prediction module analyzes the key feature data with the extubation prediction model.

In one embodiment of the invention, the system for establishing the extubation prediction using the machine learning model further comprises a database for collecting feature data of patients, wherein the feature data comprise consciousness data, input/output liquid data, ventilatory function data and physiological parameter data; the processing device comprises a data processing module; and each of the patients has a record of using a ventilatory assistance device during hospitalization.

In another embodiment of the invention, the data processing module can be used for performing a data preprocessing procedure on the feature data of the patients in the database in order to delete data in the feature data exceeding a preset reasonable range, and/or complement data missing in the feature data.

In another embodiment of the invention, the extubation prediction module analyzes the key feature data with the extubation prediction model, and then generates a correlated information between the key feature data and a probability of extubation.

In another embodiment of the invention, the processing device further comprises a visualization module for converting the correlated information between the key feature data and the probability of extubation into a visualization interface, such as bar graph, broken line graph, SHAP force plot, partial dependence plot (PDP).

In yet another embodiment of the invention, the processing device further comprises a model training module for training a machine learning model with at least a part of the feature data of the patients, and verifying to generate the extubation prediction model and a key feature.

Wherein the key feature comprises age, a number of days of using a ventilator, and GCS score, urine volume, injection volume, nutrition amount, RASS score, PIP, MAP, ventilatory rate and heart rate of 1 day and 2 days before the day of performing the extubation prediction.

Furthermore, another embodiment of the invention discloses a method for establishing an extubation prediction using a machine learning model for predicting a possibility of extubation in real time through the machine learning model. Specifically, the method for establishing the extubation prediction using the machine learning model comprises following steps of: (a) obtaining feature data used for training; (b) performing training with the machine learning model and obtaining an extubation training model; (c) obtaining key feature data of a patient to be predicted; and (d) analyzing the key feature data with the extubation training model to obtain a possibility of extubation of the patient to be predicted.

Wherein obtaining, training, performing, analyzing are performed by a processor using computer readable instructions stored in a database.

Wherein the step a further comprises a data preprocessing step for removing the feature data used for training that do not meet a standard, and/or complementing an insufficient part of the feature data used for training by means of interpolation.

Wherein the step d further comprises obtaining a correlation between each of the key features and the probability of extubation, and converting the correlation into a visualization interface.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
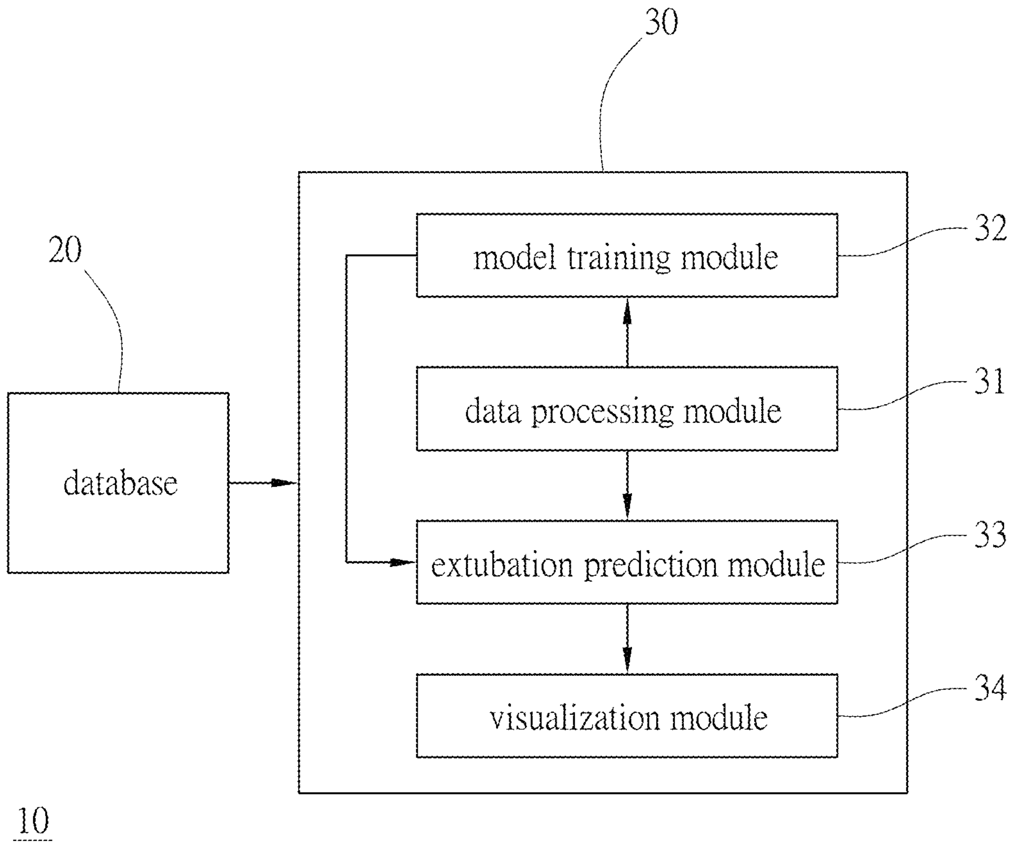
FIG. 1 is a schematic diagram of a system for establishing an extubation prediction using a machine learning model according to an embodiment of the invention.

The invention discloses a system and a method thereof for establishing an extubation prediction using a machine learning model capable of obtaining an extubation prediction model and key feature used by the extubation prediction model through training and/or verification of a machine learning model, and analyzing key feature data of a patient in real time through the extubation prediction model in order to obtain a possibility of extubation of the patient and its related explanation. Accordingly, the system and the method thereof for establishing the extubation prediction using the machine learning model disclosed in the invention are used as a tool for clinical caregivers to evaluate extubation in order to reduce a possibility of being unable to breathe spontaneously or requiring reintubation after extubation.

It must be emphasized that the system and method thereof for establishing extubation prediction using machine learning model disclosed in the present invention are to incorporate patients' consciousness data and input/output fluid data, so the extubation prediction results can be closer to the results of the doctor's clinical judgment. It means that the system and method thereof for establishing extubation prediction using machine learning model disclosed in the present invention can achieve a more accurate extubation prediction rate.

The terms used in the invention will be described below, for ones that are not listed in the following description, they will be explained based on reference materials recognized by a person having ordinary skill in the art to which the invention pertains, such as thesaurus, dictionary, literature or common knowledge.

The term "dynamic parameter" refers to data or results obtained from regular or irregular testing of patients during hospitalization.

The term "consciousness/awareness domain" refers to data obtained based on a patient's state of consciousness assessed by a system, a scale or a method, such as the Glasgow Coma Scale (GCS), the Richmond Agitation-Sedation Scale (RASS).

The term "fluid balance domain" refers to data related to fluids entering a patient's body or fluids eliminated by a patient, such as urine volume, injection volume, infusion volume, and total force-fed volume.

The term "ventilatory function domain," refers to data related to a patient's ventilatory function or cardiopulmonary function, such as peak airway pressure (PIP), mean airway pressure (MAP), a number of days of using a ventilator, and ventilatory rate.

The term "physiological parameter domain" refers to physiological data of a patient, such as weight, body mass index, height.

The term "ventilatory assistance device" or "ventilator" refers to an external device installed on a patient to assist the patient in ventilation/inhalation.

The term "module" refers to a component with specific functions composed of several basic functional elements, which can be used to form a system, a device or a program with complete functions, for example, a module can be an electronic circuit.

The term "ICU" is an abbreviation of Intensive Care Unit, which refers to an intensive care ward for severe illness in a hospital, and different wards can belong to different departments according to division.

The term "machine learning" refers to the use of a machine learning model to learn and improve through data, find patterns and correlations, and make decisions and predictions based on learning and analysis results. Taking an example listed in the invention as an illustration, the machine learning model comprises XGBoost (Extreme Gradient Boosting), CatBoost (categorical boosting), LightGBM (light gradient boosting machine), random forest algorithm (RF) and logistic regression (LR).

"Tube" in the term "extubation" refers to a tube used to ventilate or provide a gas, thus, "extubation" means removal from a ventilator or other ventilatory assistance devices.

The term "APACHE II" is an abbreviation of acute physiology and chronic health evaluation II, which is a disease severity scoring system ranging from 0 to 71 scores. The scoring system is based on 12 physiological data, patient age and health status as input scores, and each of the data is a worst value of a patient 24 hours after admission.

The term "SOFA" is an abbreviation of Sequential Organ Failure Assessment, which is a system for assessing disease severity. It divides organs into lungs, blood coagulation, liver, heart, nerves and kidneys, and evaluates them separately. A highest score for each of the organs is 4 scores, a lowest score is 0 score, 24 hours after entering an ICU, a total score will be calculated every 48 hours.

The term "GCS (Glasgow Coma Scale)" is a coma index and is one of the most widely used coma indices. Its assessment comprises three aspects: eye opening response, speech response, movement response, a highest score for each of the aspects is 5 scores, a lowest score is 1 score. The lower a total score, the more severe a coma procedure.

The term "RASS (Richmond Agitation-Sedation Scale)" is a scale used to measure a degree of agitation or sedation of patients with scores ranging from −4 to +4, representing different behavioral states.

The term "SHAP value" or "SHAP force plot" refers to a numerical value assigned to each feature in a datum or a set of data when a predetermined machine learning model generates a predicted value for the datum or the set of data.

The term "LIME (Local Interpretable Model-Agnostic Explanations)" refers to locally interpretable models with an object to understand complex and unexplainable models, and a principle used is to provide a locally interpretable or understandable model according to an individual to be interpreted.

The term "visualization interface" refers to the graphical display of data or information through graphics, so that users can better understand the data and information, and the so-called graphics include diagrams, tables, colors, symbols, marks, icon or other visual element.

Specifically, referring to FIG. 1, one embodiment of the invention provides a system 10 for establishing an extubation prediction using a machine learning model, which comprises a database 20 and a processing device 30.

Wherein the database 20 is a structured information or collection of data to be stored in a predetermined way, such as electronically stored in a computer system, a hard disk or a cloud space. The database 20 collects and stores feature data of patients, wherein each of the patients has a record of using a ventilatory assistance device in an intensive care unit during hospitalization, and the feature data comprise consciousness data, input/output liquid data, ventilatory function data and physiological parameter data. A source of data of the database 20 can be directly input or obtained after being connected with other external databases.

In this embodiment, the consciousness data are results of assessment of a patient's degree of consciousness or awareness, such as scores obtained from the Glasgow Coma Scale (GCS) and scores obtained from the Richmond Agitation-Sedation Scale (RASS); the input/output liquid data is an amount of liquid injected into a patient's body within a predetermined period of time, or an amount of liquid excreted by a patient, such as infusion volume, injection volume, amount of liquid intake in a diet, urine volume; the ventilatory function data are data related to a patient's ventilatory or/and cardiopulmonary function status, such as a number of days wearing a ventilatory assistance device, peak airway pressure (PIP), mean airway pressure (MAP), ventilatory rate; the physiological parameter data are a patient's physiological data, such as age, weight, body mass index.

The processing device 30 is hardware, such as a computer, a computer processor capable of handling data by a series of executing programs, instructions. The processing device 30 has a data processing module 31, a model training module 32, an extubation prediction module 33 and a visualization module 34.

Wherein the data processing module 31 is used to process feature data from patients, including performing a data preprocessing procedure and a feature data extraction procedure. Specifically, the data preprocessing procedure refers to a step of deleting or/and complementing the feature data after the data processing module 31 reads the feature data of the patients in the database 20, that is, the data processing module 31 receives a preset reasonable range of each feature and uses the preset reasonable range as a judgment standard, when one of the feature data does not fall within the preset reasonable range, the feature datum is deleted; and checks whether a quantity of the feature data meets a predetermined value, if the quantity does not meet the predetermined value, it is determined that the feature data is missing a part, and the missing part of the feature data should be complemented by taking an average value of the feature data. The feature data extraction procedure refers to the data processing module 31 reading the feature data of a patient to be predicted, and then extracting data related to a key feature therefrom for using as key feature data.

The model training module 32 receives the feature data processed by the data processing module 31, and uses at least a part of the feature data to train a machine learning model, and uses at least a part of the feature data to verify the trained machine learning model and results obtained to generate an extubation prediction model and the key feature data used in the extubation prediction model.

In this embodiment, the machine learning model is an algorithmic logic or an algorithm well-known in the technical field to which the invention pertains, such as XGBoost (Extreme Gradient Boosting), CatBoost (categorical boosting), LightGBM (light gradient boosting machine), random forest algorithm (RF) and logistic regression (LR).

In this embodiment, there are 20 key features, including age, a number of days of using a ventilatory assistance device, GCS score, urine volume, injection volume, nutrient amount, RASS score, PIP, MAP, ventilatory rate, heart rate measured on one day before and two days before a day of performing the extubation prediction.

The extubation prediction module 33 obtains the extubation prediction model from the model training module 32, and uses the extubation prediction model to analyze the key feature data from the patient to be predicted in order to generate a probability of extubation of the patient to be predicted within 24 hours after the day of performing the extubation prediction, and a correlated information between each key feature and the probability of extubation.

The visualization module 34 converts the correlated information between each key feature and the probability of extubation into a visualization interface for presenting on a display or a device with a display, such as computer, screen, tablet computer, mobile phone.

With a composition of the above components, the system 10 for establishing the extubation prediction using the machine learning model disclosed by the invention is capable of automatically analyzing in real time whether a patient hospitalized in an intensive care unit is in a state suitable for removing a ventilatory assistance device. A quantitative method provides clinicians with a probability of extubation as a reference for assessing extubation, and can further provide clinicians with a correlated information between each key feature and the probability of extubation to achieve an efficacy of increasing a reliability of the probability of extubation by increasing an interpretability of the probability of extubation.

Another embodiment of the invention provides a method for establishing an extubation prediction using a machine learning model comprising following steps:

step 101: inputting feature data used for training, wherein the feature data are obtained from patients who use a ventilatory assistance device during hospitalization in an intensive care unit, the feature data comprise consciousness data, input/output liquid data, ventilatory function data and physiological parameter data, descriptions of the consciousness data, the input/output liquid data, the ventilatory function data and the physiological parameter data are the same as those in the foregoing embodiments, so no further descriptions are provided herein;

step 102: performing a data preprocessing procedure on the feature data used for training for deleting the unreasonable feature data and/or complementing the missing feature data; for training a machine learning model with at least a part of the feature data used for training that has completed the data preprocessing procedure; and for performing a verification procedure on the trained machine learning model with at least a part of the feature data used for training that has completed the data preprocessing procedure in order to produce an extubation prediction model and a key feature;

wherein the extubation prediction model is selected from a group consisting of XGBoost (Extreme Gradient Boosting), CatBoost (categorical boosting), LightGBM (light gradient boosting machine), random forest algorithm (RF) and logistic regression (LR);

wherein the key feature comprises age, a number of days of using a ventilator, and GCS score, urine volume, injection volume, nutrition amount, RASS score, PIP, MAP, ventilatory rate and heart rate of 1 day and 2 days before a day of performing the extubation prediction;

step 103: inputting key feature data of a patient to be predicted, wherein the patient to be predicted is in a state of using a ventilatory assistance device, and the key feature data are data or numerical values of the key feature measured from the patient to be predicted; and step 104: analyzing the key feature data with the extubation prediction model, generating a probability of extubation of the patient to be predicted within 24 hours after the day of performing the extubation prediction, and a correlated information between the key feature data and the probability of extubation, and converting the probability of extubation and the correlated information into a visualization interface, including, for example, color, pattern, graphics, figure, shape, line or a combination of at least any two of the above.

In order to illustrate the efficacies, the technical features of the invention can achieve, several examples are provided as detailed description as follows.

All tests in the following examples are reviewed and approved by the Research Ethics Review Committee of Taichung Veterans General Hospital, and follow the guidelines of informed consent and anonymization.

Example 1: Data Analysis of Subjects

Data of patients admitted to intensive care units of Taichung Veterans General Hospital between July 2015 and July 2019 are collected, the data of patients who did not use ventilators and the data of patients who used ventilators for less than 72 hours are excluded, and finally 5940 subjects who used ventilators for more than 48 hours are screened out, and statistical analysis results of feature data of the subjects are shown in Table 1, wherein data in Table 1 are expressed as mean value±standard deviation or amount (percentage); CCI stands for Charlson Comorbidity Index. From the contents of Table 1, it can be known that there are 3657 subjects who removed a ventilator during an ICU period, and 2283 subjects who did not remove a ventilator during an ICU period; a total of 65 feature data are used; an average age of the subjects is 66.2±16.2 years old, and 64.0% of the subjects are male; a disease severity of the subjects is significantly high, APACHE II score and SOFA score are 25.7±6.6 and 8.5±3.6 respectively, and 61.5% of the subjects are extubated during ICU hospitalization, however, distributions of age, gender, and CCI index between the extubated subjects and the non-extubated subjects are similar, but APACHE II score and SOFA score of the non-extubated subjects are higher than those of the extubated subjects.

Then, according to four main clinical domains in a clinical workflow, dynamic parameters of the subjects during ICU hospitalization are classified and processed and statistically analyzed, results are shown in Table 2. Wherein the four main clinical domains are consciousness/awareness domain, fluid balance domain, ventilatory function domain, and physiological parameter domain respectively, wherein the consciousness/awareness domain comprises the Glasgow Coma Scale (hereinafter referred to as GCS) and the Richmond Agitation-Sedation Scale (hereinafter referred to as RASS); the fluid balance domain comprises liquid, urine volume, total amount of force-feeding given to a patient; the ventilatory function domain comprises peak airway pressure (PIP), mean airway pressure (MAP), number of days of using a ventilator, ventilatory rate; the physiological parameter domain comprises heart rate. From the results in Table 2, it can be known that during ICU hospitalization the extubated patients' consciousness continues to improve, sedation state decreases, heart rate and infusion volume gradually decrease, and urine volume and force-fed volume show a steady increase.

TABLE 1 statistical analysis results of the feature data of the subjects who are extubated and not extubated during a period in an intensive care unit

| | All subjects (5940) | Extubated subjects (2283) | Non-extubated subjects (3657) | p value |
|---|---|---|---|---|
| Demographics | | | | |
| Age (year) | 66.2 ± 16.2 | 65.8 ± 16.0 | 66.4 ± 16.3 | 0.12 |
| Gender (male) | 3799 (64.0%) | 1482 (64.9%) | 2317 (63.4%) | 0.24 |

TABLE 1-continued statistical analysis results of the feature data of the subjects who are extubated and not extubated during a period in an intensive care unit

| | All subjects (5940) | Extubated subjects (2283) | Non-extubated subjects (3657) | p value |
|---|---|---|---|---|
| BMI | 24.0 ± 5.0 | 23.5 ± 4.8 | 24.0 ± 5.2 | <0.01 |
| CCI | 2.1 (1.4) | 2.1 (1.4) | 2.2 (1.5) | 0.05 |
| Types of ICU | | | | >0.01 |
| Internal medicine ICU | 2831 (47.7%) | 1043 (45.7%) | 1788 (48.9%) | |
| Surgical ICU | 1272 (21.4%) | 512 (22.4%) | 760 (20.8%) | |
| Neurological ICU | 1281 (19.8%) | 575 (25.2%) | 601 (16.4%) | |
| Cardiological ICU | 399 (6.7%) | 110 (4.8%) | 289 (7.9%) | |
| Cardiac Surgery ICU | 262 (4.4%) | 43 (1.9%) | 219 (6.0%) | |
| Severity | | | | |
| APACHE II | 25.7 ± 6.6 | 26.7 ± 6.8 | 25.0 ± 6.3 | <0.01 |
| SOFAscore | 8.5 ± 3.6 | 9.0 ± 3.9 | 8.2 ± 3.4 | <0.0 |
| Final state (outcome) | | | | |
| ICU (days) | 14.7 ± 10.6 | 17.2 ± 12.0 | 13.1 ± 9.3 | <0.01 |
| Ventilator (days) | 12.2 ± 10.8 | 16.0 ± 12.0 | 9.7 ± 9.1 | <0.01 |
| Hospitalization (days) | 29.4 ± 16.7 | 30.3 ± 18.6 | 28.8 ± 15.4 | <0.01 |

TABLE 2 results of statistical analysis of dynamic parameters of the non-extubated subjects and the extubated subjects

| | All subjects (5940) | Extubated subjects (2283) | Non-extubated subjects (3657) | p value |
|---|---|---|---|---|
| Day 1 | | | | |
| GCS | 7.5 ± 4.4 | 6.8 ± 4.2 | 8.0 ± 4.4 | <0.001 |
| RASS | −2.9 ± 1.9 | −3.2 ± 1.8 | −2.7 ± 1.9 | <0.001 |
| Ventilatory rate (per minute) | 19.2 ± 3.7 | 19.5 ± 3.8 | 19.1 ± 3.6 | <0.001 |
| PIP ($cmH_2O$) | 22.3 ± 6.0 | 22.8 ± 6.2 | 22.0 ± 6.0 | <0.001 |
| MAP($cmH_2O$) | 12.4 ± 3.1 | 12.6 ± 3.3 | 12.2 ± 2.9 | <0.001 |
| Heart rate (per minute) | 96.6 ± 19.2 | 95.9 ± 20.0 | 92.9 ± 18.5 | <0.001 |
| Urine volume (ml) | 1248.4 ± 1172.1 | 1270.1 ± 1243.4 | 1235.0 ± 1125.4 | 0.290 |
| Injection volume (ml) | 2515.0 ± 1929.8 | 2643.5 ± 2036.9 | 2439.7 ± 1855.6 | <0.001 |
| Volume of force-feeding (ml) | 484.1 ± 437.1 | 504.2 ± 464.9 | 471.4 ± 425.1 | 0.045 |
| Day 3 | | | | |
| GCS | 9.1 ± 4.7 | 7.3 ± 4.6 | 10.2 ± 4.5 | <0.001 |
| RASS | −2.1 ± 2.0 | −2.9 ± 1.9 | −1.6 ± 1.8 | <0.001 |
| Ventilatory rate (per minute) | 18.0 ± 4.0 | 18.8 ± 4.5 | 17.4 ± 3.6 | <0.001 |
| PIP ($cmH_2O$) | 23.6 ± 5.3 | 24.7 ± 5.6 | 22.9 ± 4.9 | <0.001 |
| MAP ($cmH_2O$) | 12.2 ± 3.4 | 13.0 ± 3.9 | 11.8 ± 3.0 | <0.001 |
| Heart rate (per minute) | 88.4 ± 17.4 | 91.8 ± 18.8 | 86.3 ± 16.1 | <0.001 |
| Urine volume (ml) | 2012.8 ± 1354.6 | 1807.5 ± 1384.7 | 2139.2 ± 1320.1 | <0.001 |
| Injection volume (ml) | 1706.2 ± 1338.8 | 1929.9 ± 1579.1 | 1566.8 ± 1142.5 | <0.001 |
| Volume of force-feeding (ml) | 969.0 ± 508.0 | 939.5 ± 519.6 | 986.8 ± 500.2 | 0.002 |
| Day 7 | | | | |
| GCS | 10.5 ± 4.5 | 8.0 ± 4.7 | 12.0 ± 3.7 | <0.001 |
| RASS | −2.2 ± 2.4 | −3.2 ± 2.2 | −1.6 ± 2.3 | <0.001 |
| Ventilatory rate (per minute) | 18.8 ± 3.7 | 19.0 ± 4.3 | 18.7 ± 3.4 | 0.010 |

TABLE 2-continued results of statistical analysis of dynamic parameters of the non-extubated subjects and the extubated subjects

| | All subjects (5940) | Extubated subjects (2283) | Non-extubated subjects (3657) | p value |
|---|---|---|---|---|
| PIP ($cmH_2O$) | 23.2 ± 5.6 | 24.8 ± 5.8 | 22.0 ± 5.1 | <0.001 |
| MAP ($cmH_2O$) | 11.7 ± 3.4 | 12.8 ± 3.8 | 11.2 ± 2.8 | <0.001 |
| Heart rate (per minute) | 88.7 ± 16.3 | 90.8 ± 17.9 | 87.7 ± 15.2 | <0.001 |
| Urine volume (ml) | 2093.0 ± 1280.6 | 2055.9 ± 1346.8 | 2140.5 ± 1240.6 | <0.001 |
| Injection volume (ml) | 1168.4 ± 1060.9 | 1413.7 ± 1231.7 | 1030.7 ± 923.7 | <0.001 |
| Volume of force-feeding (ml) | 1160.3 ± 571.4 | 1122.7 ± 571.5 | 1180.5 ± 570.4 | 0.001 |

Example 2: Results of Machine Learning Model Calculation

Figure 2A:
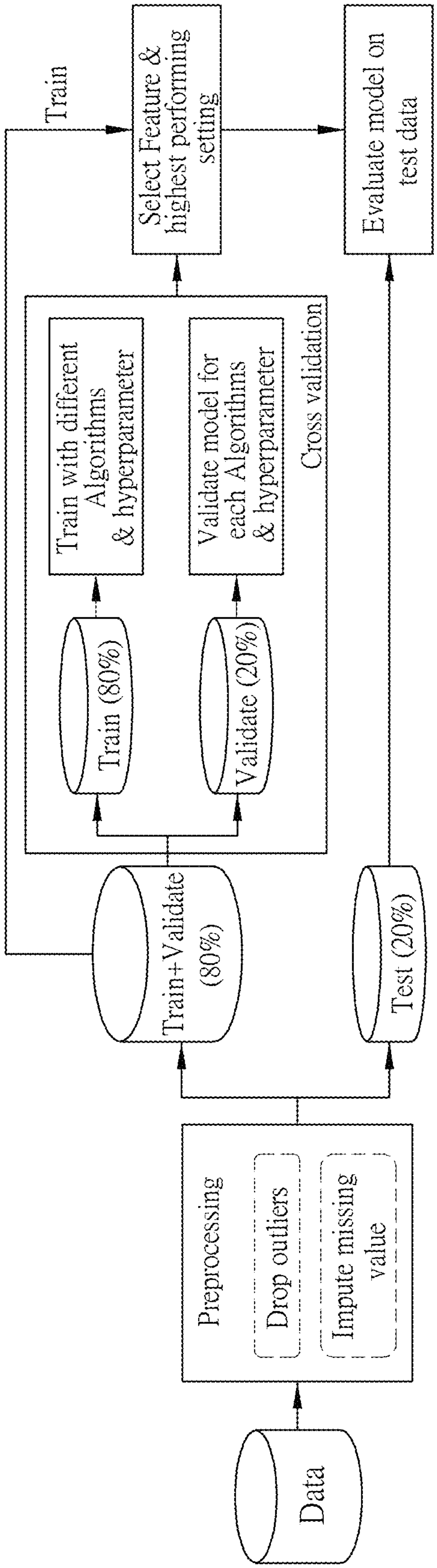
FIG. 2A shows flow charts of data analysis disclosed in the invention.

Please refer to FIG. 2A, 20 most correlated features (hereinafter referred to as 20 key features) are selected from the feature data of the subjects collected in Example 1 as modeling data, and analyzed with different machine learning models, wherein the machine learning models used comprise XGBoost (Extreme Gradient Boosting), CatBoost (categorical boosting), LightGBM (light gradient boosting machine), random forest algorithm (RF) and logistic regression (LR), and a training/testing ratio is 80/20. The 20 key features are results of analyzing original feature data through recursive feature elimination analysis.

Figure 2B:
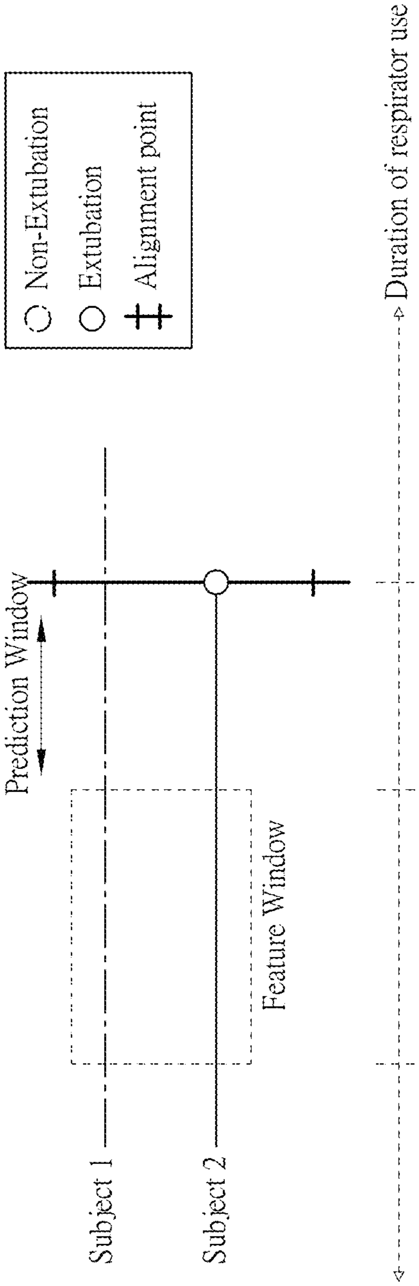
FIG. 2B shows flow charts of data collection disclosed in the invention.

Please refer to FIG. 2B. In order to achieve an object of predicting on a day before extubation, classification is performed at a time point when the feature data of the subjects are obtained, which means that data of a day before extubation are used as a prediction window; and the feature data of two days before removing a ventilatory tube (and 2nd day and 3rd day before extubation) are used as a feature window. Therefore, the modeling data comprise age, a number of days using a ventilator, and GCS, urine volume, injection volume, nutrition amount, RASS, PIP, MAP, ventilatory rate, heart rate on the 2nd day and the 3rd day before extubation respectively.

Before analysis, the data preprocessing procedure can be performed on the feature data of the subjects collected in Example 1. The so-called data preprocessing comprises removing abnormal data and inputting missing data, wherein the abnormal data refer to numerical values exceeding a reasonable range of variables. In this example, the reasonable range of variables is set by a doctor. For example, a reasonable range of each of the variables is as follows: age is 1-100 years old, a number of days wearing a ventilator is 1-60 days, GCS is 3-15, urine volume is 0-5000 ml, injection volume is 0-10000 ml, nutrition amount is 0-3000 ml, RASS is −5-+4, PIP is 0-50, MAP is 10-40, ventilatory rate is 0-40, heart rate is 0-300; and in this example, an average value of each of the variables is input to complement the missing data.

In addition, before the machine learning models are used for data analysis, all data are standardized from +1 to −1; and, in order to avoid sampling bias, two sets of data are used in the extubated subjects, one of the sets is data of 1 day before extubation, the other set is random data, and five sets of data are randomly selected from the non-extubated subjects; a ratio of the feature data of the extubated subjects to the feature data of the non-extubated subjects is 1:3.4.

Figure 3A:
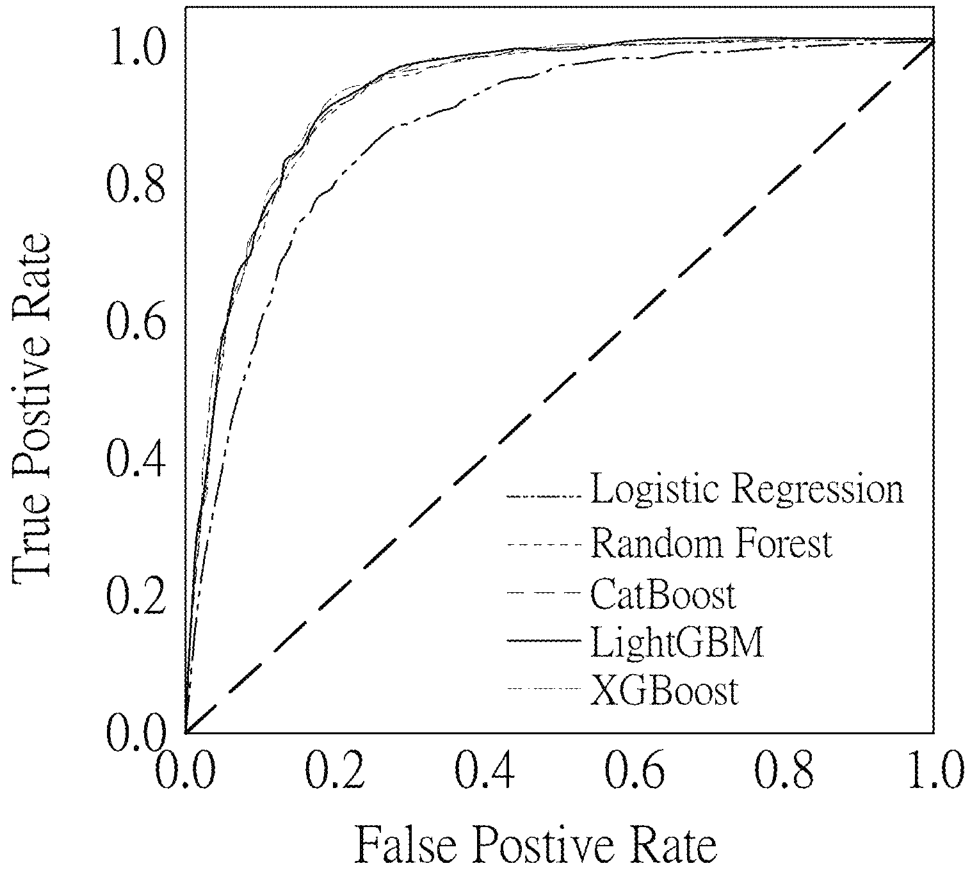
FIG. 3A shows performances of different machine learning models in predicting extubation using calibration curve analysis.

Analysis results of each of the machine learning models are shown in FIG. 3 and Table 3, wherein an accuracy in Table 3 is calculated by the following formula: (TP+TN)/(TP+FN+TN+FP).

TABLE 3 performance indicator of each of the machine learning models for extubation prediction

| | Machine learning model | Preciseness | Specificity | Sensitivity | F-1 | Brier Score | Accuracy |
|---|---|---|---|---|---|---|---|
| Verification | LR | 0.602 ± 0.012 | 0.777 ± 0.006 | 0.818 ± 0.008 | 0.639 ± 0.010 | 0.144 ± 0.002 | 0.793 ± 0.004 |
| | RF | 0.660 ± 0.013 | 0.810 ± 0.010 | 0.891 ± 0.009 | 0.757 ± 0.008 | 0.116 ± 0.004 | 0.834 ± 0.008 |
| | CatBoost | 0.695 ± 0.010 | 0.846 ± 0.003 | 0.853 ± 0.002 | 0.766 ± 0.006 | 0.106 ± 0.004 | 0.848 ± 0.002 |
| | LightGBM | 0.710 ± 0.010 | 0.858 ± 0.002 | 0.842 ± 0.003 | 0.771 ± 0.006 | 0.102 ± 0.003 | 0.854 ± 0.001 |
| | XGBoost | 0.732 ± 0.11 | 0.878 ± 0.006 | 0.806 ± 0.008 | 0.767 ± 0.009 | 0.101 ± 0.003 | 0.857 ± 0.006 |
| Testing | LR | 0.599 | 0.777 | 0.815 | 0.961 | 0.148 | 0.788 |
| | RF | 0.665 | 0.818 | 0.881 | 0.758 | 0.118 | 0.837 |
| | CatBoost | 0.688 | 0.844 | 0.842 | 0.757 | 0.108 | 0.843 |
| | LightGBM | 0.692 | 0.848 | 0.839 | 0.759 | 0.105 | 0.845 |
| | XGBoost | 0.720 | 0.873 | 0.798 | 0.757 | 0.103 | 0.852 |

Figure 3B:
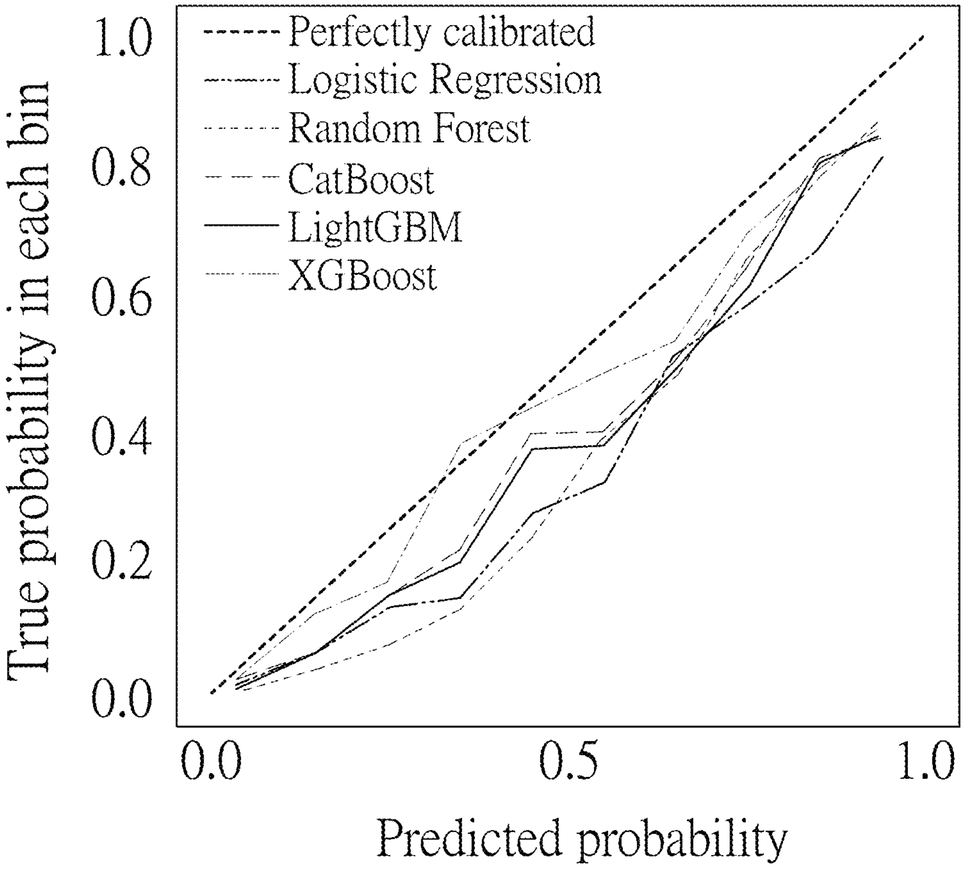
FIG. 3B shows performances of different machine learning models in predicting extubation using decision curve analysis.
Figure 3C:
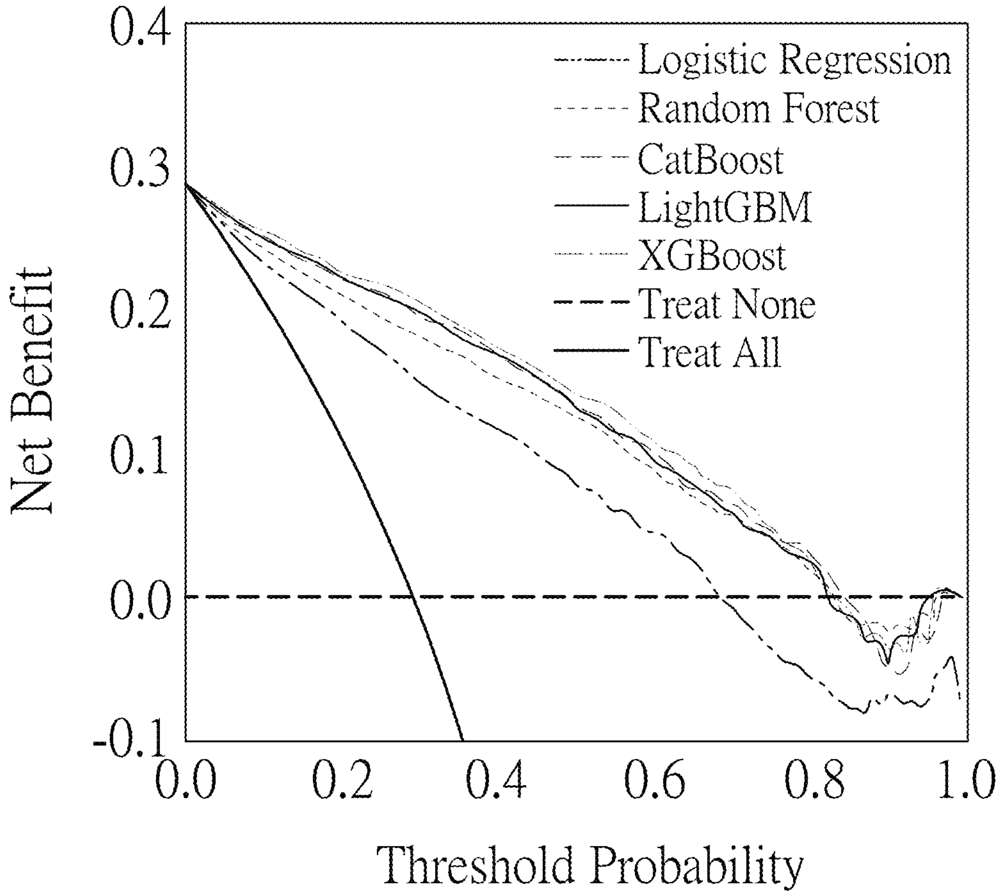
FIG. 3C shows performances of different machine learning models in predicting extubation using areas under the curves.

From the results in FIG. 3 and Table 3, it can be known that compared with the lower accuracy of LR, the accuracies of the other four machine learning models are all high. Specifically, the AUCs of XGBoost, LightGBM, CatBoost, and RF are 0.921, 0.921, 0.920 and 0.918 respectively; and it can be known from FIG. 3B that there is a good consistency between a predicted value of each of the machine learning models and an actual observed value, and the consistency of XGBoost is the best; and from the results of FIG. 3C, it can be known that all the five machine learning models have a certain clinical effectiveness, wherein performances XGBoost and LightGBM are the best.

Example 3: Correlation Analysis of Features Related to Extubation Prediction

In this example, the machine learning model used is XGBoost.

Figure 4:
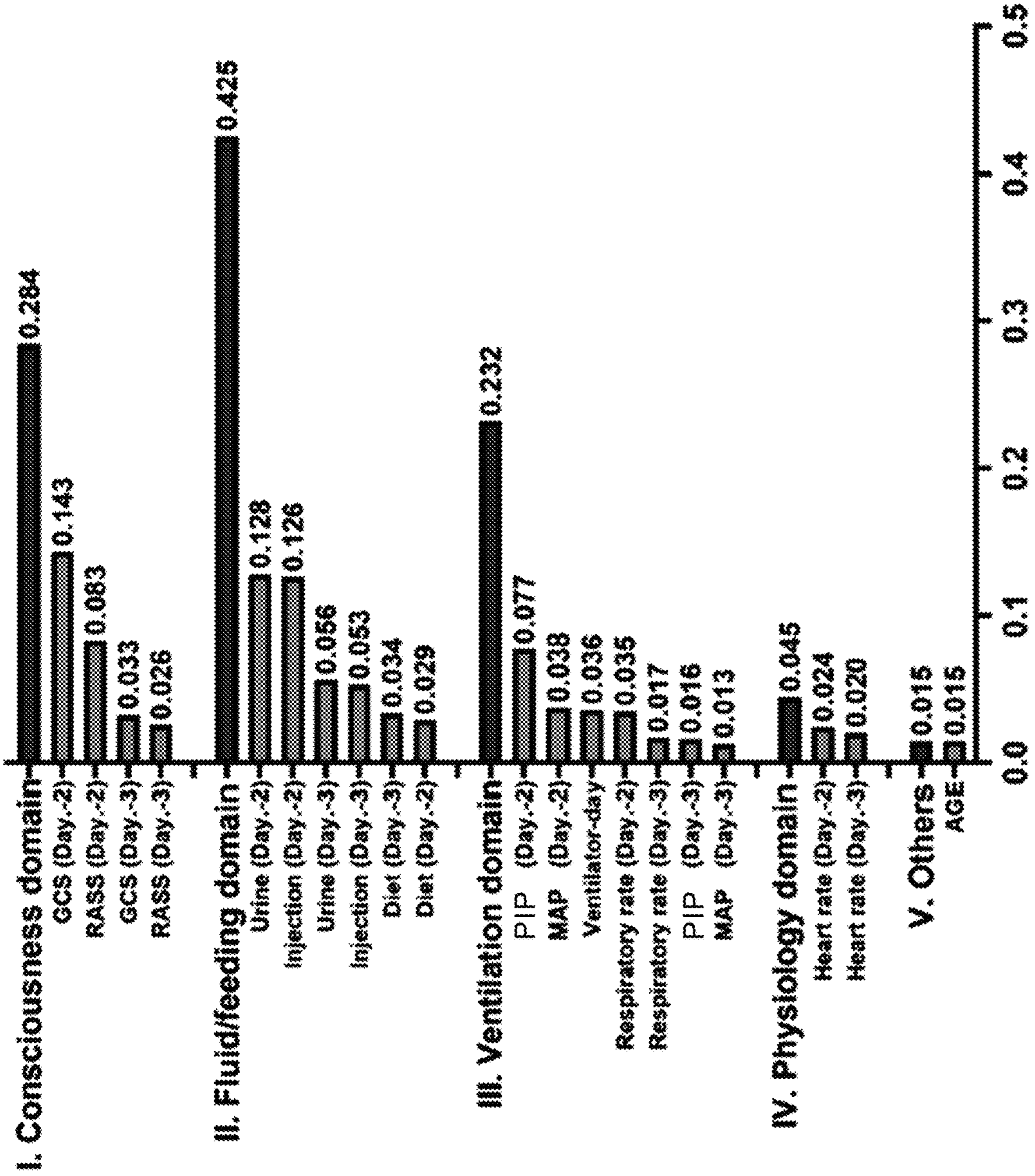
FIG. 4 shows importance degrees of each major clinical domain for intensive care.

According to the four main clinical domains disclosed in Example 1, the 20 key features obtained in Example 2 are respectively classified into the corresponding main clinical domains, an importance degree of each of the key features is analyzed, and by accumulating importance values of the key features in each of the main clinical domains, importance degrees between each of the main clinical domains and extubation prediction can be obtained, as shown in the results in FIG. 4. From the results in FIG. 4, importance degrees of the consciousness/awareness domain, the fluid balance domain, the ventilatory function domain, and the physiological parameter domain in intensive care for severe illness can be known, and numerical values of the importance degrees are 0.284, 0.425, 0.232, and 0.045, respectively.

Figure 5:
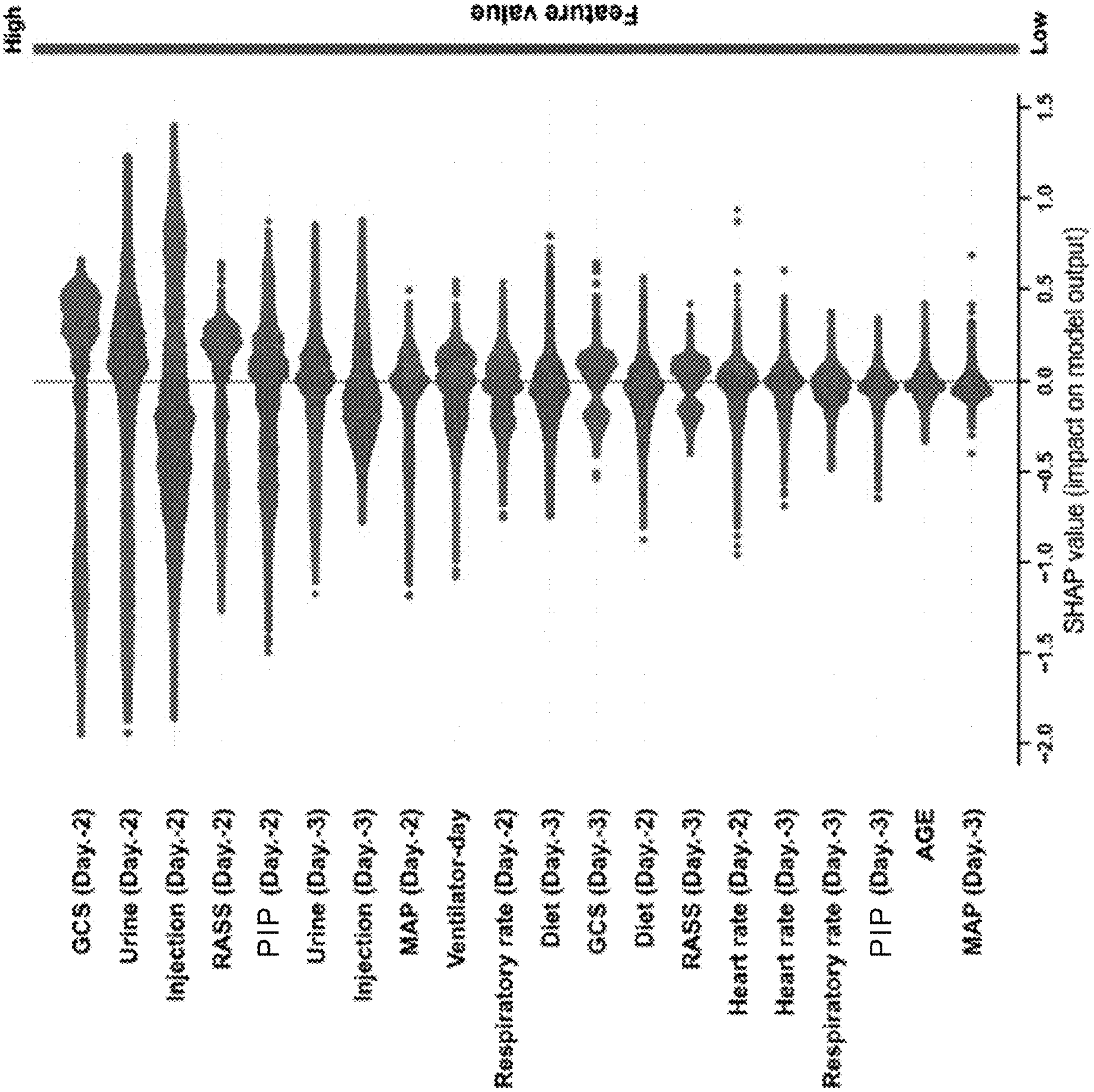
FIG. 5 illustrates a correlation between each key feature and an extubation prediction model with SHAP values.
Figure 6A:
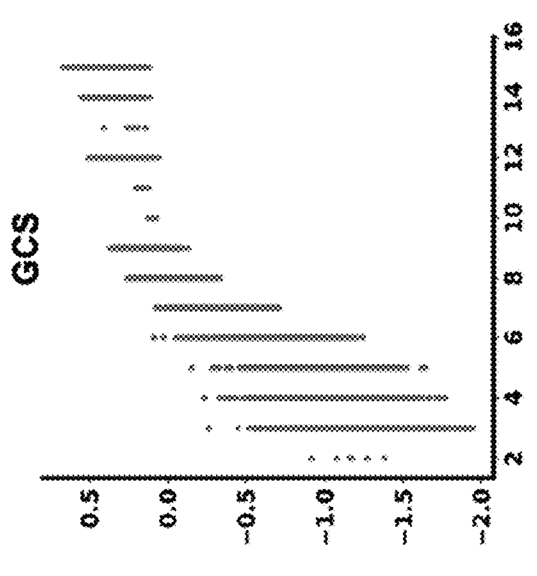
FIG. 6A is a partial dependence plot of an influence of GCS on a probability of extubation predicted by XGBoost.
Figure 6B:
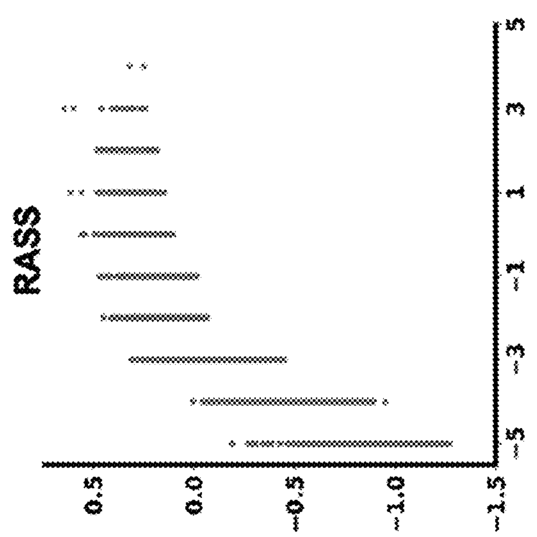
FIG. 6B is a partial dependence plot of an influence of RASS on a probability of extubation predicted by XGBoost.
Figure 6C:
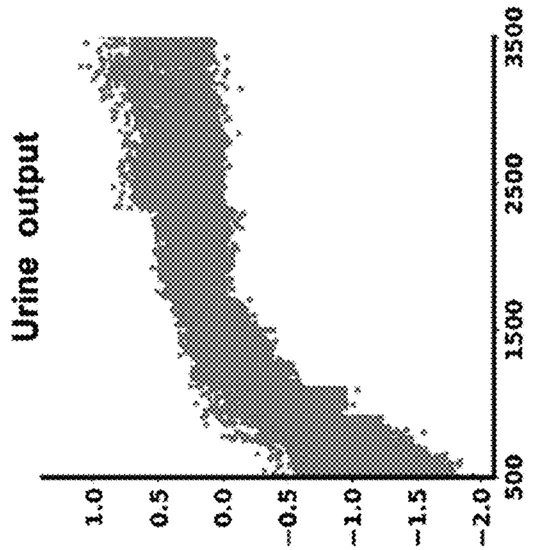
FIG. 6C is a partial dependence plot of an influence of urine volume on a probability of extubation predicted by XGBoost.
Figure 6D:
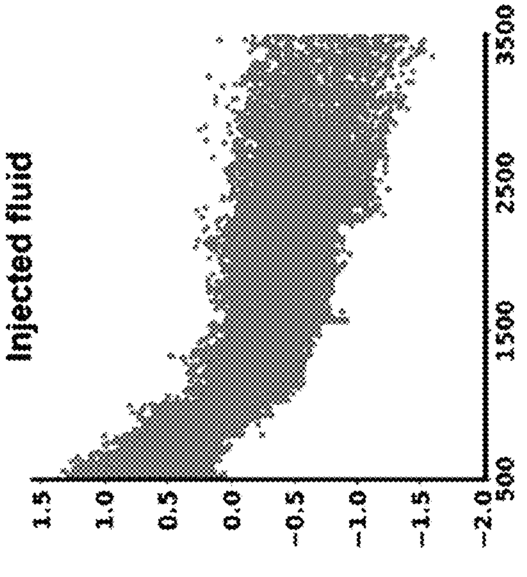
FIG. 6D is a partial dependence plot of an influence of injection volume on a probability of extubation predicted by XGBoost.
Figure 6E:
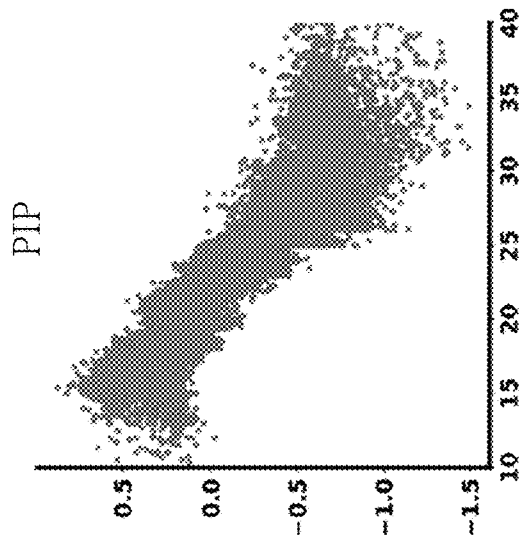
FIG. 6E is a partial dependence plot of an influence of PIP on a probability of extubation predicted by XGBoost.
Figure 6F:
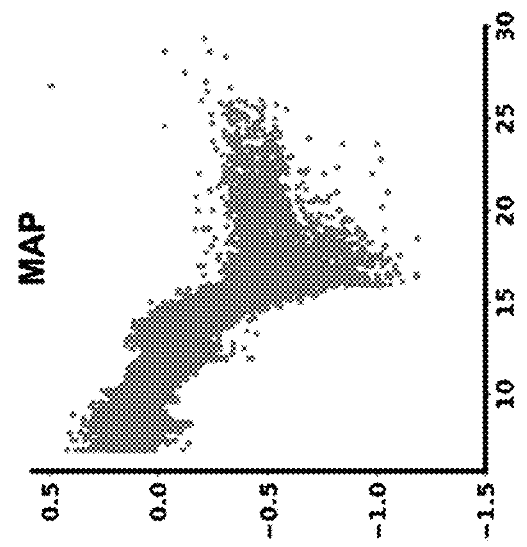
FIG. 6F is a partial dependence plot of an influence of MAP on a probability of extubation predicted by XGBoost.

Then, how the 20 key features affect the possibility of extubation can be obtained by using SHAP values, and the results are shown in FIG. 5. From the results in FIG. 5, it can be known that improvement of GCS and increase of urine volume are positively correlated with a higher probability of extubation one day later; while a high volume of injected liquid is negatively correlated with the probability of extubation.

Further, as shown in FIG. 6A to FIG. 6F, by using the partial dependence plot (PDP), how the key features such as GCS, RASS, urine volume, injection volume, PIP, and MAP affect the machine learning models assessing the probability of extubation can be obtained. The results from FIG. 6A to FIG. 6F show that each of the main clinical domains or/and each of the key features after being visualized can be used as a basis for explaining a success rate of extubation, that is, through each of the main clinical domains or/and a SHAP value of each of the key features or the partial dependence plot, a clinician is capable of knowing a reason or an argument basis of results of extubation prediction obtained through the method for establishing the extubation prediction using the machine learning model disclosed in the invention.

Example 4: Analysis of Impact of the Key Features on Extubation Prediction

Figure 7A:
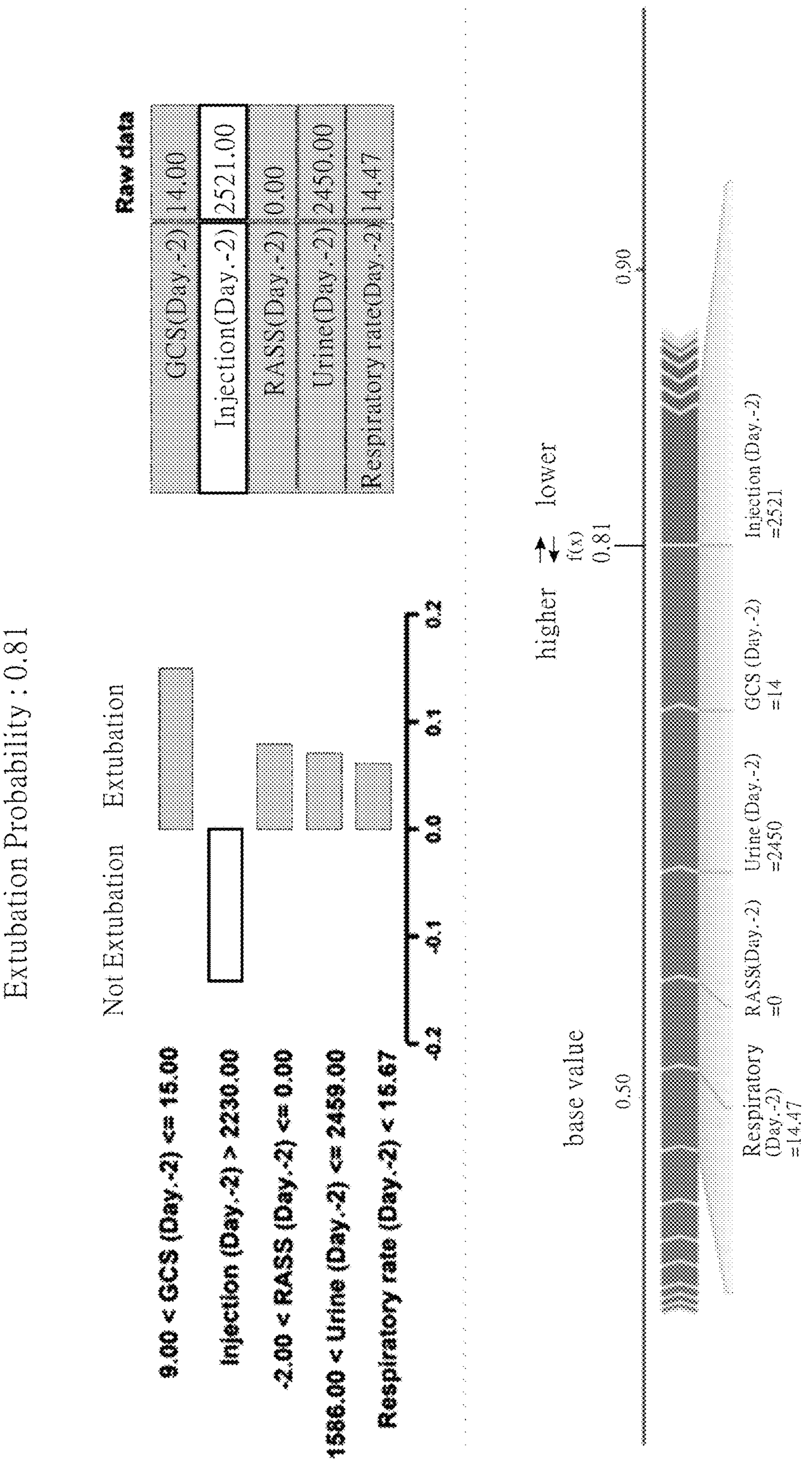
FIG. 7A shows the results of an overall impact of key features on extubation prediction of two different individuals by means of LIME and SHAP values of the key features in example 1.
Figure 7B:
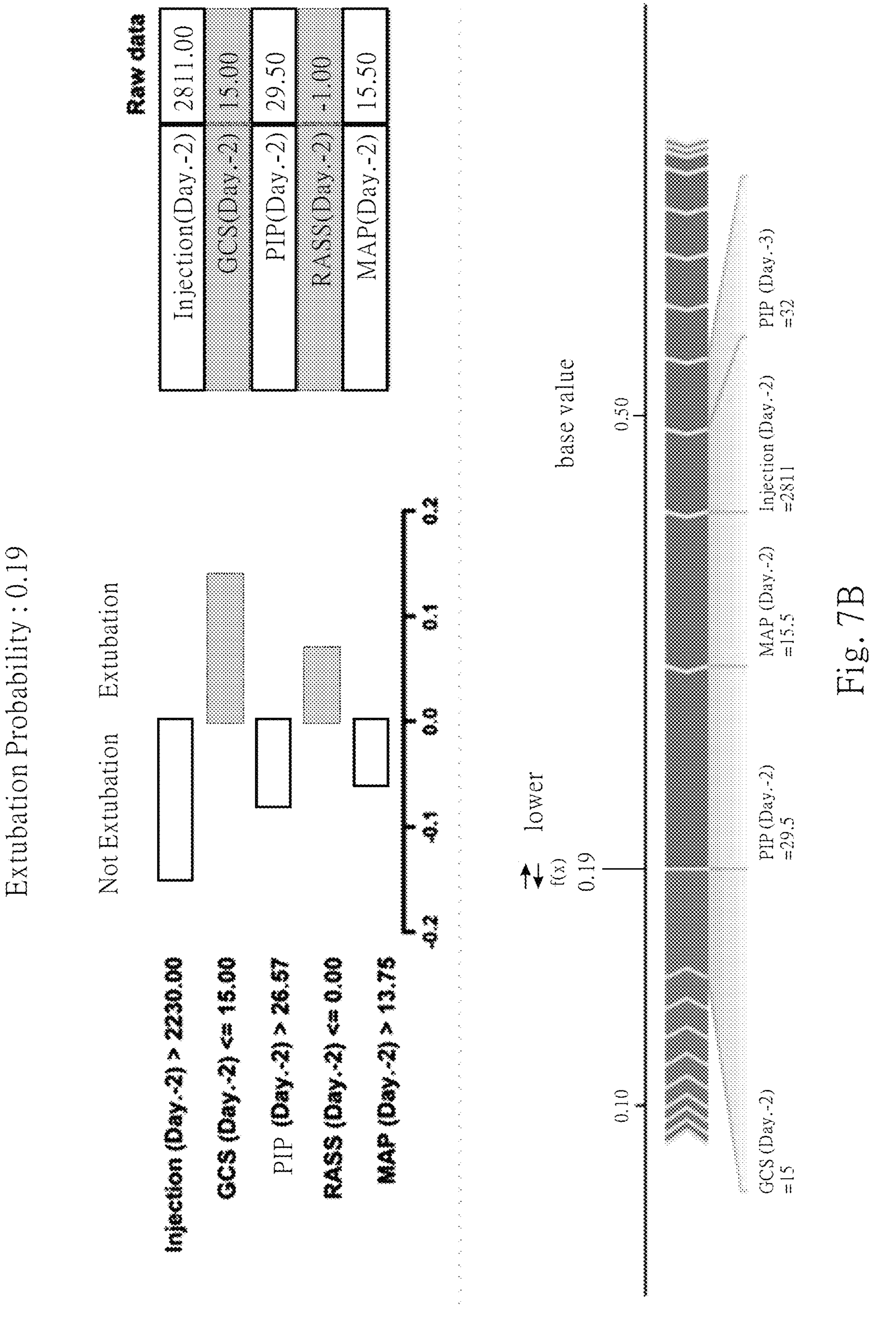
FIG. 7B shows the results of an overall impact of key features on extubation prediction of two different individuals by means of LIME and SHAP values of the key features in example 2.

FIG. 7A and FIG. 7B illustrate an overall impact of the key features on the extubation prediction of two different individuals through LIME and SHAP values of the key features, wherein in FIG. 7A and FIG. 7B, red represents variables with an incremental effect on an overall probability of extubation prediction, while blue represents variables with a decremental effect on an overall probability of extubation prediction. Specifically, it can be known from the results in FIG. 7A that although an injection volume in Example 1 is relatively high (2521 ml) on the second day before extubation, there are still many variables that are conducive to extubation, including clear consciousness (GCS is 14 and RASS is 0), high urine volume (2450 ml on the 2nd day before extubation) and low ventilatory rate (14.5 on the 2nd day before extubation). Therefore, a possibility of the extubation prediction in Example 1 is 0.81. On the contrary, from the results in FIG. 7B, it can be known that there are many variables that are unfavorable to extubation in Example 2, including high injection volume (2811 ml one day before extubation), high PIP (29.50 cmH2O) and MAP (15.5 mg/dL), so even though Example 2 has relatively clear consciousness (GCS is 15 and RASS is −1), a possibility of the extubation prediction in Example 2 is only 0.19.

Example 5: Results of Machine Learning Model Calculation Without the Key Features With reference to the content disclosed in Example 2, the different machine learning models are used to analyze the feature data of the subjects, but the difference is that the feature data of the subjects used for analyzing do not comprise features of consciousness domain: GCS and RASS, and then preciseness, specificity, sensitivity, accuracy and AUROC of the results obtained by each of the machine learning models are checked, and the results are shown in Table 4 below.

TABLE 4 performance of each of the machine learning models for extubation prediction without the specific key features

| | Machine learning model | Preciseness | Specificity | Sensitivity | Accuracy | AUROC |
|---|---|---|---|---|---|---|
| Verification | XGBoost | 0.319 ± 0.005 | 0.762 ± 0.009 | 0.763 ± 0.019 | 0.762 ± 0.006 | 0.836 ± 0.006 |
| | RF | 0.313 ± 0.003 | 0.732 ± 0.006 | 0.817 ± 0.019 | 0.743 ± 0.004 | 0.842 ± 0.003 |
| | LR | 0.285 ± 0.005 | 0.782 ± 0.020 | 0.728 ± 0.020 | 0.717 ± 0.006 | 0.812 ± 0.009 |
| | CatBoost | 0.323 ± 0.004 | 0.781 ± 0.016 | 0.781 ± 0.016 | 0.763 ± 0.005 | 0.848 ± 0.004 |
| | LightGBM | 0.328 ± 0.004 | 0.747 ± 0.008 | 0.747 ± 0.008 | 0.772 ± 0.003 | 0.848 ± 0.003 |
| Testing | XGBoost | 0.315 | 0.757 | 0.763 | 0.758 | 0.836 |
| | RF | 0.311 | 0.731 | 0.808 | 0.741 | 0.836 |
| | LR | 0.284 | 0.710 | 0.763 | 0.717 | 0.803 |
| | CatBoost | 0.320 | 0.752 | 0.799 | 0.758 | 0.843 |
| | LightGBM | 0.324 | 0.764 | 0.779 | 0.765 | 0.846 |

Comparing the results of Table 3 with those in Table 4, it can be known that when the key features disclosed in the invention are missing, a reliability of the obtained possibility of the extubation prediction will be reduced.

Although the invention has been disclosed as above with the embodiments, it is not intended to limit the invention. A person having ordinary skill in the art to which the invention pertains can make various changes and modifications without departing from the spirit and scope of the invention. Therefore, scope of protection of the invention shall be subject to what is defined in the pending claims.

What is claimed is:

1. A system for establishing an extubation prediction using a machine learning model, comprising:

a database for collecting feature data of patients, wherein each of the patients has a record of using a ventilatory assistance device during hospitalization, and the feature data comprise consciousness data, input/output liquid data, ventilatory function data and physiological parameter data; and a processing device having a data processing module for extracting key feature data from the feature data of a patient subject to the extubation prediction, wherein the key feature data comprise the physiological parameter data, and the consciousness data, the input/output liquid data and the ventilatory function data obtained 1 day or/and 2 days before a day of performing the extubation prediction; and an extubation prediction module for analyzing the key feature data by using an extubation prediction model, and obtaining a probability of extubation of the patient subject to the extubation prediction within 24 hours after the day of performing the extubation prediction.

2. The system for establishing the extubation prediction using the machine learning model as claimed in claim 1, wherein the extubation prediction module analyzes the key feature data with the extubation prediction model, and then generates a correlated information between the key feature data and the probability of extubation.

3. The system for establishing the extubation prediction using the machine learning model as claimed in claim 2, wherein the processing device further comprises a visualization module for converting the correlated information between the key feature data and the probability of extubation into a visualization interface.

4. The system for establishing the extubation prediction using the machine learning model as claimed in claim 1, wherein the extubation prediction model is selected from a group consisting of XGBoost (Extreme Gradient Boosting), CatBoost (categorical boosting), LightGBM (light gradient boosting machine) and random forest algorithm (RF).

5. The system for establishing the extubation prediction using the machine learning model as claimed in claim 1, wherein the processing device further comprises a model training module;

the model training module trains a machine learning model with at least a part of the feature data of the patients, and verifies to generate the extubation prediction model and a key feature.

6. The system for establishing the extubation prediction using the machine learning model as claimed in claim 5, wherein the data processing module reads the feature data of the patients in the database, and performs a data preprocessing procedure in order to delete data exceeding a preset reasonable range, or/and complement missing data.

7. A method for establishing an extubation prediction using an machine learning model, capable of predicting a possibility of extubation in real time, and comprising following steps:

step a: inputting feature data used for training, wherein the feature data are obtained from patients who use a ventilatory assistance device during hospitalization, and the feature data comprise consciousness data, input/output liquid data, ventilatory function data and physiological parameter data;

step b: training a machine learning model by using at least a part of the feature data used for training to generate an extubation prediction model and a key feature, wherein the key feature comprises age, a number of days of using a ventilator, and GCS score, urine volume, injection volume, nutrition amount, RASS score, PIP, MAP, ventilatory rate and heart rate of 1 day and 2 days before a day of performing the extubation prediction;

step c: inputting key feature data of a patient subject to the extubation prediction, wherein the patient subject to the extubation prediction is in a state of using a ventilatory assistance device; and step d: analyzing the key feature data by using the extubation prediction model, and obtaining a probability of extubation of the patient subject to the extubation prediction within 24 hours after a day of performing the extubation prediction.

8. The method for establishing the extubation prediction using the machine learning model as claimed in claim 7, wherein the extubation prediction model is selected from a group consisting of XGBoost (Extreme Gradient Boosting), CatBoost (categorical boosting), LightGBM (light gradient boosting machine) and random forest algorithm (RF).

9. The method for establishing the extubation prediction using the machine learning model as claimed in claim 7, wherein the step a further comprises a data preprocessing step for removing the feature data used for training that do not meet a standard, and/or complementing an insufficient part of the feature data used for training by means of interpolation.

10. The method for establishing the extubation prediction using the machine learning model as claimed in claim 7, wherein the step d further comprises obtaining a correlation between each of the key features and the probability of extubation, and converting the correlation into a visualization interface.

* * * * *